(12) United States Patent
Speranza (10) Patent No.: US 6,540,455 B1
(45) Date of Patent: Apr. 1, 2003

(54) MACHINE AND METHOD FOR CIRCUMFERENTIALLY MILLING A CYLINDRICAL WORK PIECE

(75) Inventor: Richard J. Speranza, Jeannette, PA (US)

(73) Assignee: Speranza Specialty Machining, Export, PA (US)

( * ) Notice: Subject to any disclaimer, the term of this patent is extended or adjusted under 35 U.S.C. 154(b) by 0 days.

(21) Appl. No.: 09/491,298

(22) Filed: Jan. 25, 2000

(51) Int. Cl.$^7$ .................................................. B23C 3/34
(52) U.S. Cl. ........................ 409/132; 409/179; 409/175
(58) Field of Search ............................... 409/132, 175, 409/177, 178, 179

(56) References Cited

U.S. PATENT DOCUMENTS

| | | | | |
|---|---|---|---|---|
| 2,561,484 A | * | 7/1951 | Shaw et al. .................. | 409/179 |
| 2,842,238 A | * | 7/1958 | Shaw et al. .................. | 409/179 |
| 3,477,341 A | * | 11/1969 | Rickenbrode ............... | 409/179 |
| 3,603,204 A | * | 9/1971 | Anderson, Sr. et al. ...... | 409/179 |
| 3,699,828 A | * | 10/1972 | Piatek et al. ................. | 409/178 |
| 4,269,552 A | * | 5/1981 | Unigovsky et al. .......... | 409/179 |
| 4,297,061 A | * | 10/1981 | Wolfe et al. ................. | 409/179 |
| 4,648,761 A | * | 3/1987 | Mitchell et al. ............. | 409/132 |
| 4,929,131 A | * | 5/1990 | Allemann .................... | 409/132 |
| 5,161,291 A | * | 11/1992 | Guenther ..................... | 409/178 |
| 5,683,211 A | * | 11/1997 | Gordon ....................... | 409/178 |

* cited by examiner

Primary Examiner—Daniel W. Howell
(74) Attorney, Agent, or Firm—James L. Sherman (57) ABSTRACT

A circumferential milling machine is for milling along an arcuate portion of a cylindrical work piece having a cylindrical outer surface and is capable of milling a series of circumferentially space holes or slots, axially expanded holes or slots and/or tapered holes or slots in the arcuate portion of the cylindrical work piece. The machine includes a circumferential moving block mounted for circumferential movement along the arcuate portion with a pair of axial moving blocks mounted at opposite ends of the circumferential moving block being capable of axial movement with respect thereto. A radial moving block is mounted on either of the axial moving blocks for radial movement toward and away from the cylindrical outer surface and includes a milling device rigidly mounted thereon. The rotational axis of the milling device remains perpendicular to the cylindrical outer surface and extends through the central axis of the cylindrical work piece as combined selective circumferential, axial and radial movement allows controlled milling throughout the arcuate portion of the cylindrical work piece.

18 Claims, 5 Drawing Sheets

MACHINE AND METHOD FOR CIRCUMFERENTIALLY MILLING A CYLINDRICAL WORK PIECE

BACKGROUND OF THE INVENTION

1. Field of the Invention

This invention relates to a circumferential milling machine for milling along an arcuate portion of a cylindrical work piece having a cylindrical outer surface and, more specifically, to such a milling machine which is capable of milling a series of circumferentially space holes or slots, axially expanded holes or slots and/or tapered holes or slots in the arcuate portion of the cylindrical work piece.

2. Brief Description of the Prior Art

In the power industry, a number of steam power plants have been in existence for a number of years. These steam power plants include countless components, machines, equipment and systems which tend to degrade or malfunction with age and must be repaired or replaced with time. Further, in order to determine the status of such components, machines, equipment and systems with time, it is not uncommon for the operators of such power systems to rely on various testing and maintenance programs to detect and evaluate the condition and reliability of various components, machines, equipment and systems of the power plant.

One such area of the steam power plant includes the steam piping and distribution systems that are essential for the effective and safe operation of the of the plant. For example, many steam power plants utilize large cylindrical header pipes which include a plurality of smaller distribution pipes mounted on and extending from the headers. In such a header configuration, there would be a plurality of sets of pipes which would be generally mounted at one side of the header. Each set includes all the pipes thereof which are circumferentially separated and aligned with in a common arcuate sector of the cylindrical header. Each set of pipes is axially separated from adjacent sets of pipes. The terminal end of each pipe in each set extends perpendicularly from the outer cylindrical from the header. As each pipe of the set extends outwardly from the cylindrical header, it is bent or curved to be generally aligned with the other pipes of the set and with the pipes of the other sets axially separated therefrom so that all the pipes will be directed in the same direction generally away from the header.

The joining of each of the pipes in each set to the header is a critical and is subject to significant wear and deterioration with time. Accordingly, it has been found through elaborate nondestructive testing that weakened areas due to stress may develop in the regions of the header between the adjacent pipes of various sets of pipes. Such area affected by the stress tend to significantly weaken the header and have not been found to be correctable by simple welding or patching.

Accordingly, it has been found that the best and most reliable way to repair such a weakened header is to remove all of the pipes of a set, to completely remove all of the affected metal in the radial area and to replace it with weld material. However, the removal of the affected metal on the radial area has not been found to be a simple matter. In fact, it has been found to be extremely difficult. The headers are cylindrical in shape with thick walls that are typically made of high tensile steel. While there are numerous machining tools that are capable of removing such steel, there are significant problems with bringing and directing such tools to the cylindrical walls in a controllable manner in order to effectively and accurately remove the desired material. Additionally, any manner of removing the material must also be able to physically shape and form the hole that results in a proper condition for the receipt and retention of the new welding material.

When a portion of the header is found to have weakened stress areas that reduce its strength or reliability, the best way to reform the affected area first includes removing all of the pipes in the particular set of pipes in that area. If only one set of pipes are involved, the results would be a narrow arcuate area or portion the is physically located in the middle of the remaining array of sets of pipes. Clearly, accessibility to the affected area could be quite limited. Since it would be pointless and counter-productive to remove any pipes in unaffected areas simply to gain access to the affected areas, the problems of access and space limitations in a narrow arcuate area surrounded by a plurality of pipes is most significant.

Generally, if space were not an issue, there are any number machines or devices that could be used, at least to some extent, to remove material from at least a portion of a cylindrical surface. U.S. Pat. No. 4,459,883, discloses a portable machine tool for preparing pipe joints for welding but is installed within the interior of the large, hollow header. The tool components are small enough to be supported at the interior of the relatively thin walled header after they are passed through access holes. Such a system assumes that cutting or milling is only needed in the area of the pipes and that the header is of a type in which access openings are appropriate and, in fact, exist. U.S. Pat. No. 4,761,104 discloses a tube milling machine that appears to be mounted within a hole and able to mill a circular region around that hole but would not appear to be able to mill areas between adjacent hole or pipe ends such as could occur with the header problems discussed above. Similarly, U.S. Pat. No. 4,743,149 discloses a header tube tool that is specifically configure to prepare the cylindrical surface for the attachment of the ends of the pipes thereto. The tool is basically attached to the hole in the header and is configured to cut a circular area around the hole to generally provide a recess or socket into which the end of the pipe can be positioned for welding to the header.

There are various types of axial cutters for forming slots or key ways. U.S. Pat. No. 3,354,784 discloses a portable milling machine that can be mounted by a large bracketing framework to direct the cutting tool thereof to a limited axial region along the surface of the cylindrical surface of the work piece. U.S. Pat. No. 5,123,790 discloses an apparatus for milling grooves which is basically mounted on a work piece by a magnetic base. Such an apparatus would only be capable of effectively being mounted on a cylinder if it extends axially along the surface and it would then only be able to have the cutting tools to be advance axially along the surface of the cylinder to form a groove or key way that extends in the axial direction. Similar milling machines that move in the axial direction have been mounted to a cylinder by a self-centering device that is banded or strapped to the cylinder.

U.S. Pat. No. 5,161,291 discloses an adjustable machining apparatus for machining a cylindrical work piece to initially form the rotor teeth of a rotor core by the formation of a plurality of axial grooves therebetween. The milling tool is mounted on a device which is magnetically attached to the cylindrical outer surface of the rotor core. The milling tool can be primarily adjusted in three directions—the first direction would be tangential to the outer surface, the second direction would be parallel to the axis of the core, and the third direction would be perpendicular to the tangential direction. The combined movement of in the first and second directions would generally allow the milling tool to be inserted into the cylindrical surface to form the groove cross-section and movement in the third axial direction would form the grooves to establish teeth therebetween. The tool can also be adjusted about an axis that is parallel with the axis of the rotor core to allow fine, controlled adjustment of the tool head within the grooves to be able to generally shape the cross-section of the grooves which can be continued along the lengths thereof by moving the entire tool relative to the mounting in the third axial direction.

Generally, while the devices and apparatus discussed above would be capable of milling some portions of a cylindrical surface, there is nothing taught therein that would suggest how one could conveniently remove the material in an axially narrow, relatively long arcuate portion of a cylindrical work piece without repeatedly mounting, removing, repositioning and remounting the device or apparatus at a number of circumferential locations about the cylindrical surface. Nevertheless, it would be possible to mill a relatively large arcuate section of the cylinder with a device having some of the features of that disclosed in U.S. Pat. No. 5,161,291. Any relatively portable milling device capable of moving the milling tool in the first, second and third direction could be mounted on the cylindrical surface to be supported generally tangentially on the surface of the cylindrical work piece. To generally mill a tangential cut in a radial portion the cylindrical work piece the milling tool must simply be moved back and forth in a tangential manner and moved axially inward after each pass in the same manner as one would saw a log. If one were to reposition the device at a different position around the cylindrical surface, a different tangential cut could be made to effectively enlarge the arcuate portion in which the material can be removed. However, such multiple transverse cuts would require repeated, inconvenient repositioning of the device and will not properly form the edges or sides of the resulting arcuate opening in the proper manner for welding.

It should be clear that none of the milling machines discussed above are configured to conveniently mill the arcuate portion of a header in a restrict area. U.S. Pat. No. 5,683,211 discloses a device and method of forming a groove in the outer cylindrical surface of a PVC conduit or duct and at least has a configuration the recognizes the basic problems that exists when working on a cylindrical surface. Since the conduit is only made of PVC, the system uses a hand held and controlled router rather than a milling machine. A cylindrical template is secured to the conduit in the area to be routed and an interior cylindrical surface is mounted at the supporting face of the router. Clearly such a system can not be effectively and reliably used to mill an arcuate portion of a cylindrical header made of steel.

SUMMARY OF THE INVENTION

It is an object of the present invention to provide a circumferential milling machine for milling along an arcuate portion of a cylindrical work piece having a cylindrical outer surface and a central axis.

It is another object to provide such a circumferential milling machine which includes mounting apparatus which capable of being mounted on the cylindrical outer surface at the arcuate portion and includes an arcuate supporting element which extends about the cylindrical work piece and has a center which is for being aligned with the central axis.

It is still another object to provide such a circumferential milling machine which is capable of being used to mill various holes and slots in the arcuate portion of the circumferential surface and to form cross-sections for the holes or slots that are particularly configured for filling with welding material.

It is a further object to provide such a circumferential milling machine which is capable of being used to mill the various holes and slots in the arcuate portion of the circumferential surface in a confined or restricted area.

It is yet another object to provide such a circumferential milling machine that can be easily installed at the desired location and can be selectively adjusted to conveniently and accurately mill throughout the arcuate portion.

These and other objects of the invention are provided in a preferred embodiment thereof including a circumferential milling machine for milling along an arcuate portion of a cylindrical work piece having a cylindrical outer surface and a central axis. The milling machine including a mounting configuration capable of being mounted on the cylindrical outer surface at the arcuate portion of the cylindrical work piece. The mounting configuration includes an arcuate supporting element which extends about the cylindrical work piece and has a center which is for being aligned with the central axis. A circumferential moving block is mounted on the arcuate supporting element for circumferential movement along the arcuate supporting element and about the center and the central axis in general alignment with the arcuate portion. The circumferential moving block is capable of being selectively disposed at a plurality of positions along the arcuate portion of the cylindrical outer surface. The circumferential moving block has a first end and a second end circumferentially displaced from said first end. A radial moving block is capable of being mounted at the first end of the circumferential moving block for radial movement with respect to the circumferential moving block toward and away from the cylindrical outer surface and the central axis of the cylindrical work piece. A milling device is rigidly mounted on the radial moving block and includes components for rotating a milling tool installed therein. The milling tool has an axis of rotation that is generally perpendicular to the cylindrical outer surface and extends through the central axis when the circumferential moving block is disposed at each of the plurality of positions along the arcuate portion of the cylindrical work piece.

In the circumferential milling machine, the radial moving block is alternatively capable of being mounted at the second end of the circumferential moving block for the radial movement with respect to the circumferential moving block toward and away from the cylindrical outer surface and the central axis of the cylindrical work piece.

The circumferential milling machine can further include a first axial moving block which is mounted for relative movement on the first end of the circumferential moving block in an axial direction which is parallel to the central axis when the circumferential moving block is disposed at each of the plurality of positions along the arcuate portion of the cylindrical work piece, wherein the radial moving block is mounted on the first axial moving block for the radial movement with respect to the first axial moving block and the circumferential moving block toward and away from the cylindrical outer surface and the central axis of the cylindrical work piece to cause the axis of rotation to continue to be generally perpendicular to the cylindrical outer surface and to extend through the central axis when the circumferential moving block is disposed at each of the plurality of positions along the arcuate portion of the cylindrical work piece and the axial moving block is selectively positioned along the axial direction relative to the circumferential moving block.

The radial moving block is alternatively capable of being mounted at the second end of the circumferential moving block for the radial movement with respect thereto. The circumferential milling machine can further include a second axial moving block which is like the first axial moving block and is mounted for relative movement on the second end of the circumferential moving block in the axial direction when the circumferential moving block is disposed at each of said plurality of positions along the arcuate portion of the cylindrical work piece. Accordingly, the radial moving block is mounted on the second axial moving block for the radial movement with respect to the second axial moving block and the circumferential moving block toward and away from the cylindrical outer surface and the central axis of the cylindrical work piece in the same manner as when the radial moving block is mounted at the first end of the circumferential moving block.

The circumferential milling machine can further include axial adjusting components operably mounted between the circumferential moving block and each of the first and the second axial moving blocks for selectively producing the relative movement of each of the first and the second axial moving blocks in the axial direction with respect to the circumferential moving block.

The circumferential milling machine can further include radial adjusting components operably mounted between each of the first and the second axial moving blocks and the radial moving block mounted thereon for selectively producing the radial movement of the radial moving block with respect to each of the first and the second axial moving blocks and the circumferential moving block toward and away from the cylindrical outer surface and the central axis of the cylindrical work piece.

In the circumferential milling machine, the mounting components can include a plurality of radially extending supports each having a first end secured to the cylindrical outer surface and a second end disposed outwardly of the cylindrical outer surface. The radially extending supports are circumferentially displaces along the arcuate portion of the cylindrical work piece. The arcuate supporting element includes a pair of circumferential ways which are axially displaced one from the other at equal distances along the lengths thereof. Each of the pair of circumferential ways are respectively mounted by adjustable mounting elements at each of the second ends of the plurality of the radially extending supports. Each of the adjustable mounting elements are selectively adjusted to cause the center of the arcuate supporting element and each of the circumferential ways thereof to be aligned with the central axis.

In the circumferential milling machine the circumferential moving block is mounted between the pair of circumferential ways. Each of the circumferential ways includes a fixed inner arcuate gear. The circumferential moving block includes a drive shaft which extends in the axial direction and has opposite end gears respectively aligned and engaged with the inner arcuate gears. The circumferential moving block includes circumferential adjusting components for selective rotation of the drive shaft and the opposite end gears thereof along the fixed inner arcuate gears to produce the circumferential movement of the circumferential moving block along the arcuate supporting element about the center and the central axis of the cylindrical work piece.

The circumferential adjusting components can include an adjusting shaft and attached worm mounted in the circumferential moving block adjacent and perpendicular to the drive shaft. The circumferential adjusting components include a worm gear rigidly mounted on the drive shaft and in meshing engagement with the worm and the adjusting shaft and attached worm are capable of being selectively rotated for the selective rotation of the drive shaft and the opposite end gears thereof.

In another embodiment, a circumferential milling machine is for milling along an arcuate portion of a cylindrical work piece having a cylindrical outer surface and a central axis. The circumferential milling machine includes mounting components capable of being mounted on the cylindrical outer surface at the arcuate portion of the cylindrical work piece. The mounting components include an arcuate supporting element which extends about the cylindrical work piece and has a center which is for being aligned with the central axis. The mounting components include a plurality of radially extending supports each having a first end secured to the cylindrical outer surface and a second end disposed outwardly of the cylindrical outer surface. The radially extending supports are circumferentially displaces along the arcuate portion of the cylindrical work piece. The arcuate supporting element includes a pair of circumferential ways which are axially displaced one from the other at equal distances along the lengths thereof. Each of the pair of circumferential ways are respectively mounted by adjustable mounting elements at each of the second ends of the plurality of the radially extending supports. Each of the adjustable mounting elements are selectively adjusted to cause the center of the arcuate supporting element and each of the circumferential ways thereof to be aligned with the central axis. A circumferential moving block is mounted on the arcuate supporting element between the pair of circumferential ways for circumferential movement along the arcuate supporting element and about the center and the central axis in general alignment with the arcuate portion. The circumferential moving block is capable of being selectively disposed at a plurality of positions along the arcuate portion of the cylindrical outer surface. Each of the circumferential ways includes a fixed inner arcuate gear. The circumferential moving block includes a drive shaft which extends in the axial direction and has opposite end gears respectively aligned and engaged with the inner arcuate gears. The circumferential moving block includes circumferential adjusting components for selective rotation of the drive shaft and the opposite end gears thereof along the fixed inner arcuate gears to produce the circumferential movement. The circumferential moving block has a first end and a second end circumferentially displaced from the first end. First and second axial moving blocks are respectively mounted for relative movement on the first end and the second end of the circumferential moving block in an axial direction which is parallel to the central axis when the circumferential moving block is disposed at each of the plurality of positions along the arcuate portion of the cylindrical work piece. A radial moving block is mounted on at least one of the first and the second axial moving blocks for radial movement with respect to the one of the first and the second axial moving blocks and the circumferential moving block toward and away from the cylindrical outer surface and the central axis of the cylindrical work piece. A milling device is rigidly mounted on the radial moving block and is for rotating a milling tool installed thereon. The milling tool has an axis of rotation that is generally perpendicular to the cylindrical outer surface and extends through the central axis when the circumferential moving block is disposed at each of the plurality of positions along the arcuate portion, of the cylindrical work piece and when one of the first and the second axial moving blocks is selectively positioned along the axial direction relative to the circumferential moving block.

The circumferential milling machine can further include axial adjusting components operably mounted between the circumferential moving block and one of the first and the second axial moving blocks for selective production of the relative movement of one of the first and the second axial moving blocks in the axial direction with respect to the circumferential moving block The circumferential milling machine can further include radial adjusting components operably mounted between the one of the first and the second axial moving blocks and the radial moving block for selective production of the radial movement of the radial moving block with respect to the one of the first and the second axial moving blocks and circumferential moving block toward and away from the cylindrical outer surface and the central axis of the cylindrical work piece.

The circumferential adjusting components include an adjusting shaft and attached worm mounted in the circumferential moving block adjacent and perpendicular to the drive shaft. The circumferential adjusting components includes a worm gear rigidly mounted on the drive shaft and in meshing engagement with the worm and the adjusting shaft and attached worm are capable of being selectively rotated for the selectively rotation of the drive shaft.

One embodiment of the invention includes a method of milling of a type which is capable of providing at least one of a plurality of holes and slots along an arcuate portion of a cylindrical work piece having a cylindrical outer surface and a central axis. The method comprises the steps of:
  mounting a milling device on the cylindrical work piece with a rotatable milling tool thereof in general alignment toward the arcuate portion and with an axis of rotation thereof that is generally perpendicular to the cylindrical outer surface and extends through the central axis;
  selectively radially moving the milling device toward, away from and into the arcuate portion during rotation of the rotatable milling tool to be capable of producing milling of the arcuate portion of the cylindrical work piece; and
  selectively circumferentially moving the milling device along a circumferential path aligned with the arcuate portion with a center of rotation along the circumferential path being maintained in alignment with the central axis and while maintaining the axis of rotation of the milling tool generally perpendicular to the cylindrical outer surface and through the central axis;
  whereby a plurality of holes at circumferentially displaced locations along the arcuate portion are capable of being milled by the selectively circumferentially moving of the milling device including the rotatable milling tool which is a hole cutter sequentially to each of the displaced locations and then the selectively axially moving of the milling device during the rotation of the hole cutter toward and into the arcuate portion at each displaced location and whereby at least one slot which extends circumferentially in a arcuate sector of the arcuate portion is capable of being milled by the selectively radially moving of the milling device including the rotatable milling tool which is a side mill cutter into at least one location of the arcuate sector and then the selectively circumferentially moving of the milling device during the rotation of the side mill cutter as it is advanced throughout the arcuate sector.

The method of milling along an arcuate portion of a cylindrical work piece can further include the steps of installing the rotatable milling tool which is a tapered end mill cutter in the milling device and additionally milling by at least one of the selectively radially moving and the selectively circumferentially moving of the milling device during rotation of the tapered end mill cutter to produce a tapering of at least a portion of at least one of the hole and the slot.

The method of milling along an arcuate portion of a cylindrical work piece can further include the step of selectively axially moving the milling device at least in an axial direction which is parallel with the central axis while being aligned with the arcuate portion and while maintaining the axis of rotation of the milling tool generally perpendicular to the cylindrical outer surface and through the central axis, whereby at least one of the hole and the slot is capable of being milled by the selectively radially moving of the milling device including the side mill cutter into at least one of the hole and the slot and then the selectively axially moving of the milling device during the rotation of the side mill cutter to axially expand at least one of the hole and the slot in the axial direction.

The method of milling along an arcuate portion of a cylindrical work piece can further include the steps of installing the rotatable milling tool which is a tapered end mill cutter in the milling device and additionally milling by at least one of the selectively radially moving, the selectively circumferentially moving, and the selectively axially moving of the milling device during rotation of the tapered end mill cutter to produce a tapering of at least a portion of at least one of the hole and the slot which has been axially expanded.

DETAILED DESCRIPTION OF THE PREFERRED EMBODIMENTS

Figure 1:
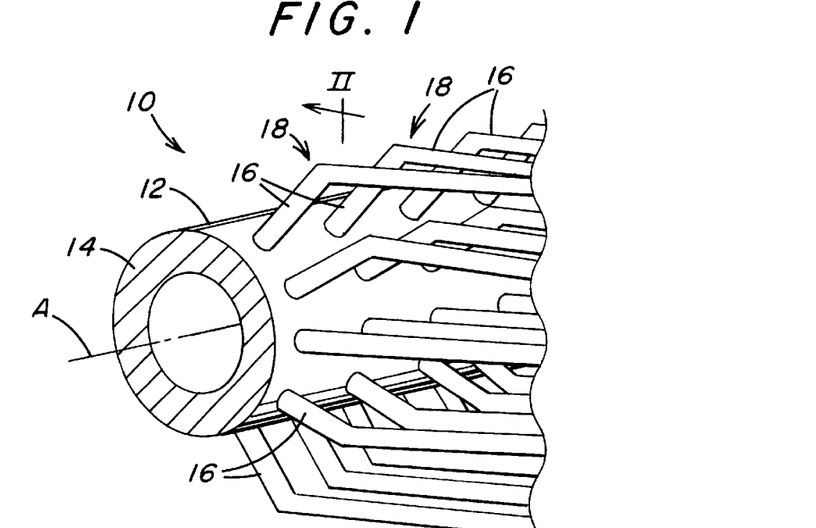
FIG. 1 is a perspective view of a typical header and pipe configuration that upon inspection has been found to include various stress areas tending to weaken the header.
Figure 2:
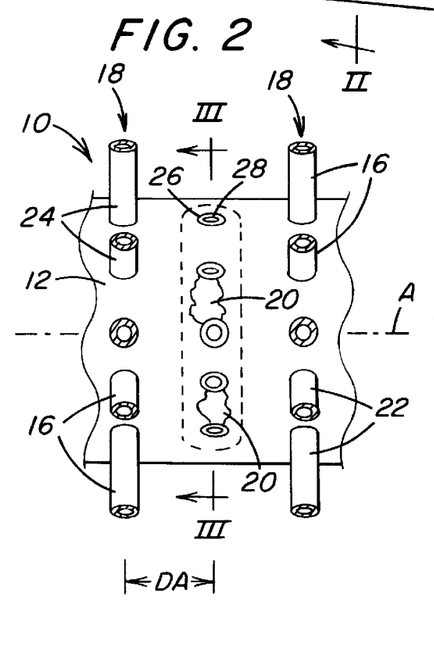
FIG. 2 is an elevational view of the typical header and pipe configuration of FIG. 1 as generally seen along Line II—II after a set of the pipes have been removed.
Figure 3:
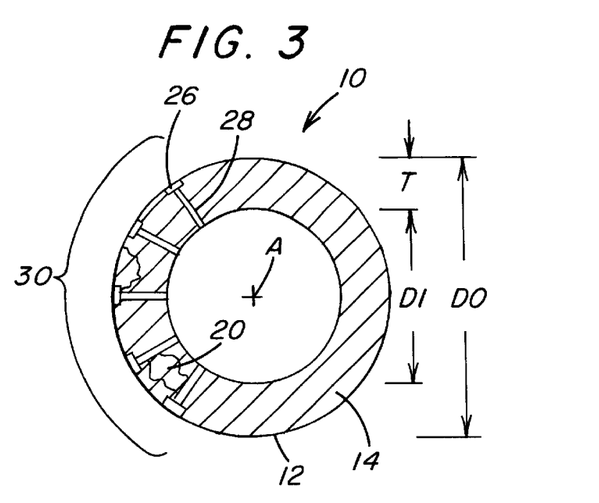
FIG. 3 is a sectional view of the cylindrical header in the area of the set of pipes that have been removed as seen along Line III—III of FIG. 2.

As seen in FIGS. 1, 2 and 3, a typical header and pipe configuration used in various types of power plants includes the header 10 having a cylindrical outer surface 12 and a central axis A. The typical header 10 in formed of high tensile steel and has an outside diameter DO of twenty five inches, and inside diameter DI of fifteen inches with a wall 14 having a thickness T of about five inches. It should be understood that other headers may be configured to include an outside diameter that might be within a range of ten to thirty inches and have different wall thicknesses but, for the purposes of explaining the operation of the preferred circumferential milling machine, the header 10 with the twenty five inch outside diameter DO is being used. It should also be understood by those skilled in the metal milling and cutting art that while the preferred circumferential milling machine might be capable of being installed on and milling headers within a limited range of outside diameters, for diameters that are significantly different, preferred circumferential milling machines which are similarly configured and operated but which have different overall dimensions might be required.

For the typical header 10, there are pipes 16 which are divided into sets 18 of five pipes 16 each which would be generally mounted at one side of the header 10. Each pipe 16 has an outside diameter of about two and a half inches and a thickness of about a half of an inch. The pipes 16 in each set are mounted to extend from the outer surface along a line which would extend through the central axis A. Each set 18 includes all the pipes 16 thereof which are circumferentially separated and aligned with in a common arcuate sector of the cylindrical header 10 but separated by an angle of about twenty to twenty five degrees from the adjacent pipes 16 of the set 18. Each set 18 of pipes 16 is axially separated from adjacent sets 18 of pipes 16 by an axial distance DA of about nine inches.

As best seen in FIG. 1, the terminal end of each pipe 16 in each set 18 extends perpendicularly from the cylindrical outer surface 12 of the header 10. As each pipe 16 of the set 18 extends outwardly from the cylindrical header 10, it is bent or curved to be generally aligned with all of the other pipes 16 of the set 18 and all of the pipes 16 of the other sets 18 axially separated therefrom as they are directed away from the header 10. Because of the joining of each of the pipes 16 in each set to the header 10 and the formation of the holes in the header wall 14 aligned with each pipe 16, the stresses in the wall 14 between the pipes 16 are critical and are subject to significant wear and deterioration with time. It has been found that weakened areas 20 due to age and stress may develop in the regions of the header 10 between the adjacent pipes 16 of the various sets 18 of pipes 16. Since such stress areas 20, which may be near the surface or deep within the wall 14 of the header 10, tend to significantly weaken the header 10 and can not be corrected by simple welding or patching, it has been found that the best and most reliable way to repair such a weakened header 10 is to remove all of the pipes 16 of a set 18 in the affected area.

As seen in FIG. 2 and in FIG. 3, each pipe 16 is typically welded at 22 to the header 10 with the terminal end 24 of the pipe 16 being inserted in a recess 26 at the outer end of an aligned hole 28 through the thick wall 14 of the header 10. The weakened areas 20 are not simply at the area of joining the pipe 16 at the weld 22 or recess 26 near the surface of the header 10 but may be within the interior of the wall 14 at any location between adjacent pipes 16 or the holes 28 aligned therewith. The normal, most confined problem situation includes the stress weakened areas 20 in one or more locations between adjacent pipes 16 of the same set 18 but without any such areas 20 between the pipes 16 of the adjacent sets 18. To correct to problem areas 20 between adjacent pipes 16 of the same set 18, all of the pipes 16 of the set 18 are removed to generally expose a relatively large arcuate portion 30 of the header 10 containing the weakened areas 20 that can not be repaired by surface welding or patching. Simply removing the pipes 16 of a set 18 would appear to allow access to the arcuate portion 30 but with the adjacent sets 18 of pipes 16 intended to remain in place and unaffected by the repair efforts, it can be seen that access to the arcuate portion 30 for milling is quite restricted and confined with an axial distance of less than eighteen inches between the remaining sets 18. Since it is not uncommon for a single set 18 of pipes 16 in the middle of or between other unaffected sets 18 of pipes 16 to be weakened at the areas 20 and to require repair work in a resulting confined space, any means of milling the arcuate portion 30 of the header 10 must be able to be installed and used in the arcuate portion 30 between the unaffected sets 18 of pipes 16.

Admittedly, it would be possible for there to be additional weakened areas that extend between adjacent pipes 16 of adjacent sets 18 so that both adjacent sets of pipes might need to be removed to expose two adjacent or overlapping arcuate portions 30 to be milled. Clearly, two adjacent arcuate portions 30 would afford greater access to each but any preferred system or method employed to mill or remove material from the cylindrical header 10 should not be configured or designed to require such a large access area.

As seen in FIGS. 4, 5, 6, 7 and 8, the preferred circumferential milling machine 40 is for milling along the relatively narrow, arcuate portion 30 of the cylindrical header 10 having the cylindrical outer surface 12 and the central axis A. The preferred circumferential milling machine 40 primarily includes mounting means 42 capable of being mounted on the cylindrical outer surface 12 at the arcuate portion 30 of the cylindrical header 10. The mounting means 42 includes an arcuate supporting element 44 which extends about 180 degrees around the cylindrical header 10 to general surround the arcuate portion 30.

Figure 4:
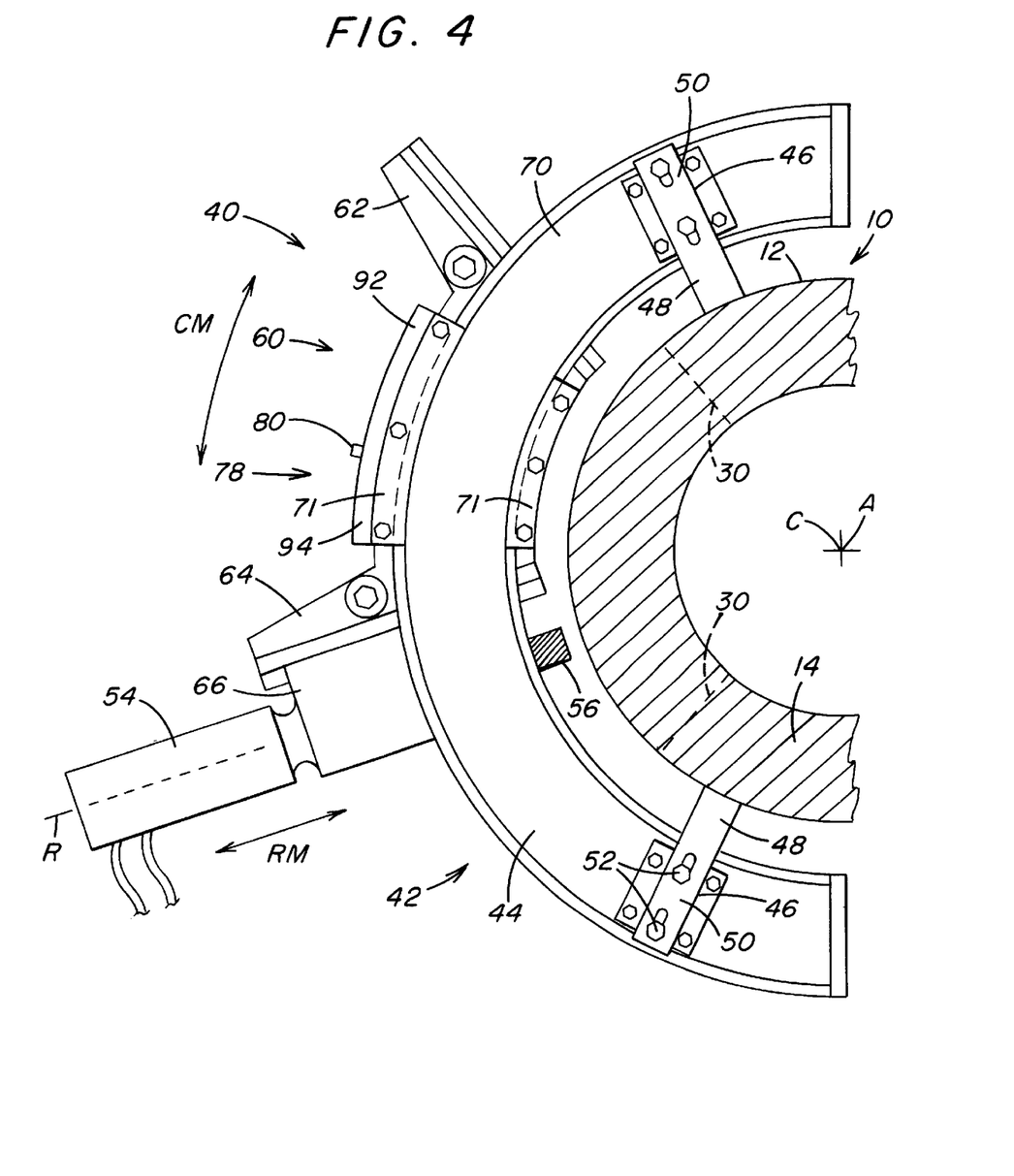
FIG. 4 is a elevational view of the preferred circumferential milling machine including various features of the invention as it would be installed on the cylindrical header at the affected arcuate portion of FIG. 3 to be repaired.
Figure 5:
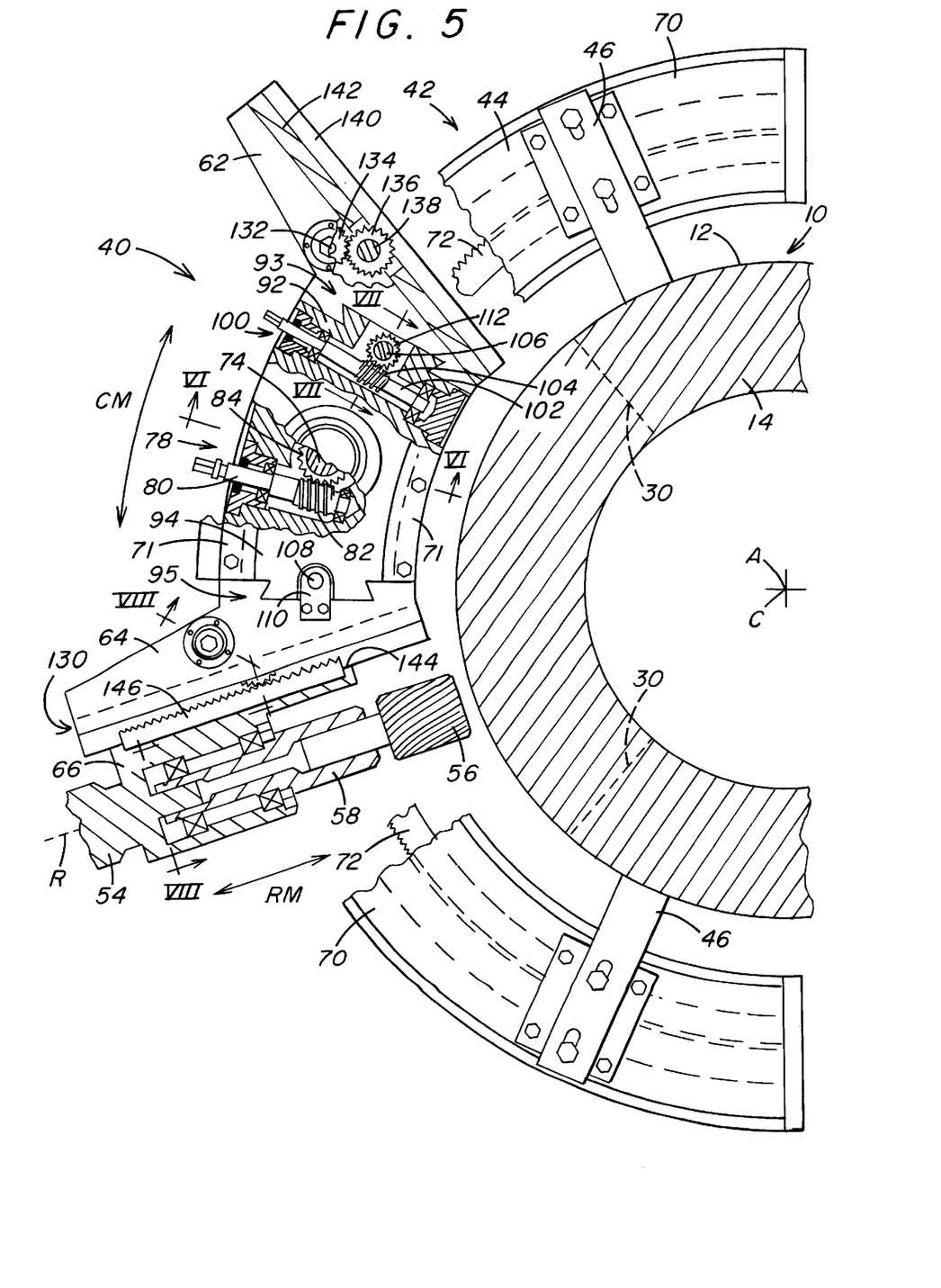
FIG. 5 is a fragmentary elevational view of the preferred circumferential milling machine like that of FIG. 4 but with various components removed or shown in sections to demonstrate the relationship of various components thereof.

It is most significant that the arcuate supporting element 44 has a center C which is for being aligned with the central axis A. To establish the proper alignment of the mounting means 42 and the arcuate supporting element 44 thereof, the mounting means 42 includes a plurality of radially extending supports 46 which circumferentially displaces along the arcuate portion 30 of the cylindrical header 10. Each of the radially extending supports 46 has a first end 48 secured to the cylindrical outer surface 12 by welding. The second ends 50 of the supports 46 are disposed outwardly of the cylindrical outer surface 12 and include slotted bolt means 52 for allowing fines adjustment of the of the arcuate supporting element 44 at the separated locations of the supports 46. Proper adjustment of the arcuate supporting element 44 on the supports 46 will insure that the center C is aligned with and overlays the central axis A.

The preferred circumferential milling machine 40, primarily with the use of the arcuate supporting element 44, will produce circumferential movement of a milling device 54 for rotating one of various types of milling tools 56 installed thereon. The preferred milling device is a hydraulically driven and capable of rotation in either direction and includes chuck means 58 for selectively mounting the tool 56 on the device 54. As will be seen, the objective of the preferred circumferential milling machine 40 is to be able to move the milling device 54 throughout the arcuate portion 30 of the cylindrical outer surface 12. The desired movement throughout the arcuate portion 30 will be seen to be in a controlled manner that insures that the milling tool 56 with an axis of rotation R that is generally perpendicular to the cylindrical outer surface 12 and extends through the central axis A throughout the movement within the arcuate portion 30.

With the arcuate supporting element 44 secured to and aligned on the header 10, the preferred circumferential milling machine 40 includes and uses a circumferential moving block 60, a pair of axial moving blocks 62,64 and a radial moving block 66 which can be combined to produce controlled movement of the milling device 54 and the tool 56 thereof throughout the arcuate portion 30 of the header 10.

Accordingly, the arcuate supporting element 44 includes a pair of circumferential ways 70 which are axially displaced one from the other at equal distances along the lengths thereof. Specifically, each of the pair of circumferential ways 70 are respectively mounted on the second ends 50 of the supports 46 by the adjustment of the slotted bolt means 52 to cause the center C of said arcuate supporting element 44 and each of said circumferential ways 70 thereof to be aligned with the central axis A.

Figure 6:
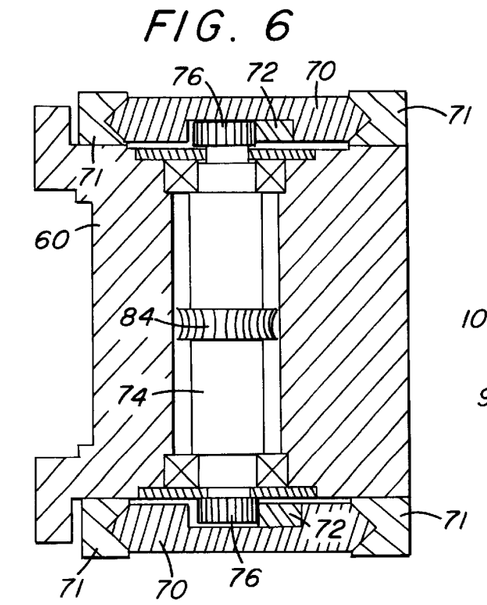
FIG. 6 is a sectional view of the circumferential adjusting means of the preferred circumferential milling machine as seen along Line VI—VI of FIG. 5.

The preferred circumferential moving block 60 is mounted on the arcuate supporting element 44 between the pair of circumferential ways 70 for circumferential movement along the arcuate supporting element 44 and about the center C and the central axis A in general alignment with the arcuate portion 30. As best seen in FIGS. 5 and 6, the circumferential moving block 60 includes a pair of opposed fixed mounting arcs 71 at each side thereof which respectively entrap the outer edges of each of the circumferential ways therebetween. Accordingly, the circumferential moving block 60 is capable of being selectively disposed at a plurality of positions along the arcuate portion 30 of the cylindrical outer surface 12 as the mounting arcs 71 slide along the outer edges of the circumferential ways 70. In order to establish the controlled circumferential movement CM, each of the circumferential ways 70 includes a fixed inner arcuate gear 72. The circumferential moving block 60 includes a drive shaft 74 which extends in an axial direction, parallel to the central axis A, and has opposite end spur gears 76 which are respectively aligned and engaged with the inner arcuate gears 72. To actually control the circumferential movement CM of the circumferential moving block 60, the block 60 includes circumferential adjusting means 78 for selective rotation of the drive shaft 74 and the opposite end spur gears 76 thereof along the fixed inner arcuate gears 72 to produce the circumferential movement. The circumferential adjusting means 78 includes an adjusting shaft 80 and attached worm 82 mounted in the circumferential moving block 60 adjacent and perpendicular to the drive shaft 74. The circumferential adjusting means 78 also includes a worm gear 84 rigidly mounted on the drive shaft 74 and in meshing engagement with the worm 82. The adjusting shaft 80 and attached worm 82, which is in engagement with a worm gear 84 fixedly mounted on the drive shaft 74, are capable of being selectively rotated for the selective rotation of the drive shaft 74 and the opposite end gears 76 thereof. As the opposite end gears 76 are rotated, the circumferential moving block 60 is selectively advanced along the inner arcuate gears 72. Accordingly, selective rotation of the circumferential adjusting means 78 will produce selective positioning of the circumferential moving block 60 along the arcuate portion 30. If the milling device 54 were to be mounted directly to the circumferential moving block 60, the milling device 54 could be positioned circumferentially along the arcuate portion 30 as indicated by the arrow CM. However, in order to produce axial movement AM (best seen in FIG. 7) parallel with the center C and the central axis A and radial movement RM toward and away from the center C and the central axis A, the circumferential milling machine 40 includes the pair of axial moving blocks 62,64 and the radial moving block 66.

Figure 7:
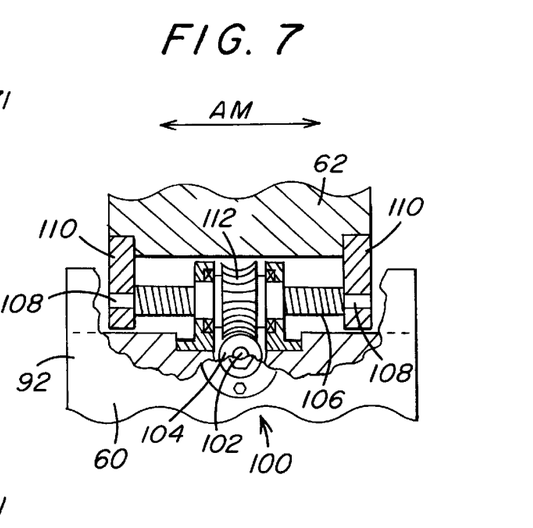
FIG. 7 is a sectional view of the axial adjustment means of the preferred circumferential milling machine as seen along Line VII—VII of FIG. 5.

Accordingly, the circumferential moving block 60 has a first end 92 and a second end 94 which is circumferentially displaced from the first end 92. The first axial moving block 62 and the second axial moving block 64 are respectively mounted for relative movement on the first end 92 and the second end 94 of the circumferential moving block 60 in an axial direction AM. The axial movement AM is parallel to the central axis A and will remain parallel thereto when the circumferential moving block 60 is disposed at each of the plurality of positions along the arcuate portion 30 of the cylindrical header 10. The basic axial movement AM is established by the mounting of the each of the axial moving blocks 62,64 on dove-tail ways 93,95 of the respective end 92,94. In order to control the axial movement of each of the axial moving blocks 62,64 along the dove-tail ways 93,95, each end 92,94 of the circumferential moving block 60 includes axial adjusting means 100. The axial adjusting means 100 includes a radially extending adjustment shaft 102 having a fixed worm 104 mounted thereon. Each of the axial moving blocks 62,64 includes within the interior thereof an axially extending threaded shaft 106 which is rigidly mounted at each end 108 at end supports 110 rigidly secured to the axial moving blocks 62,64 to prevent any rotation thereof. An internally threaded worm gear 112 is threadably mounted on the shaft 106 for relative rotation therebetween but is mounted for rotation on the end 92,94 in meshed engagement with the worm 104 in a manner to prevent any axial relative movement therebetween. Accordingly, selective, adjusting rotation of the shaft 102 and worm 104 will produce rotation of the internally threaded worm gear 112. Because the internally threaded worm gear 112 will not move axially, the rotation of the internally threaded worm gear 112 will cause the threaded shaft 106 to be advanced in one direction or the other along the axial direction AM. With the threaded shaft 106 being fixed to the axial moving block 62,64, rotation of the worm gear 112 will cause the axial moving block 62,64 to be moved relative to the circumferential moving block 60 in the axial direction AM.

In order to produce controlled radial movement RM of the milling device 54, it is mounted on the radial moving block 68, which, as seen in FIGS. 4 and 5, is mounted on the axial moving block 64 at the end 94 of the circumferential moving block 60. Because of the circumferential dimensions of the circumferential moving block 60, if the milling device 54 were to be capable of being mounted on only one end 92 or 94 thereof, the circumferential range of circumferential movement CM along the arcuate portion 30 would be quite limited. However, with the preferred circumferential moving block 60 having the axial moving blocks 62,64 at each end thereof, it is possible to selectively install the milling device 54, and the radial moving block 66 on which it is mounted, at either end to significantly increase the potential range of movement along the arcuate portion 30.

Accordingly, the preferred radial moving block 66 is adapted to be selectively mounted on either one of the first axial moving block 62 and the second axial moving block 64 for radial movement RM of the milling device 54 with respect to the axial moving block 62,64 and the circumferential moving block 60. The radial movement in the radial direction RM is selectively toward and away from the cylindrical outer surface 12 and the central axis A of the cylindrical header 10. The milling device 54 is directly mounted on the radial moving block 66, which is capable of being mounted for radial movement RM on either axial moving block 62,64. The axis of rotation R of the milling device 54 and milling tool 56 will remain generally perpendicular to the cylindrical outer surface 12 and extend through the central axis A when the circumferential moving block 60 is disposed at each of a plurality of positions along the arcuate portion 30 of the cylindrical header 10 and when the selected first axial moving block 62 or second axial moving block 64 is selectively positioned along the axial direction AM relative to the circumferential moving block 60.

Figure 8:
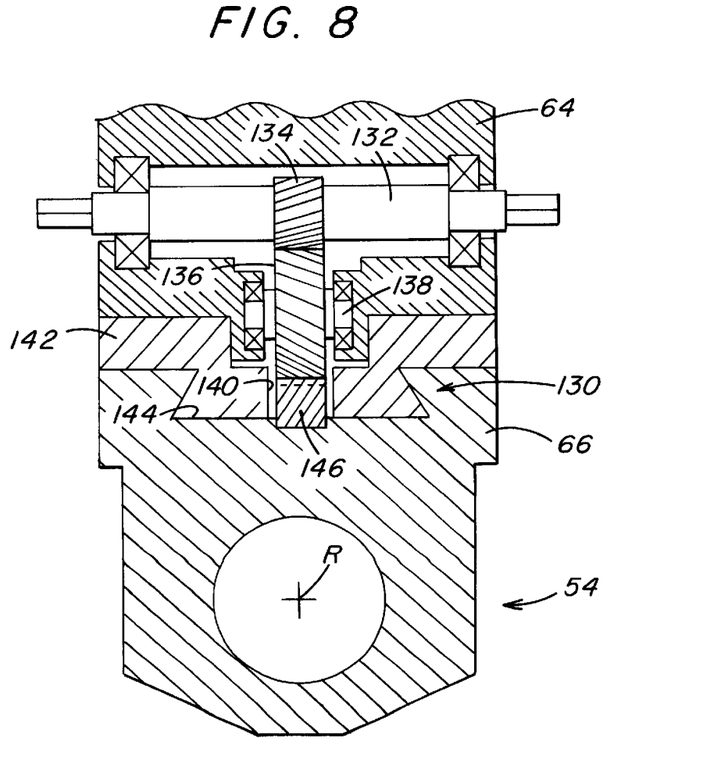
FIG. 8 is a sectional view of the radial adjustment means of the preferred circumferential milling machine as seen along Line VIII—VIII of FIG. 5.

The milling device 54 is mounted to produce the radial movement RM because of the manner by which the radial moving block 66 can be mounted on either of the axial moving blocks 62,64. As best seen in FIGS. 5 and 8, the radial moving block 66 is mounted by a dove-tail way 130 to the axial moving block 64 in order to only allow selective radial movement RM therebetween. To produce the selective radial movement RM, the axial moving block 64 (and the axial moving block 62) includes an adjusting shaft 132 that extends in a direction that is parallel to the axis A. Rigidly mounted on the adjusting shaft 132 is a gear 134 that is in meshed engagement with an intermediate gear 136 mounted for rotation on an intermediate shaft 138 which is parallel with the adjusting shaft 132. The intermediate gear 138 extends into a radial groove 140 in the dove-tail portion 142 of the dove-tail way 130 mounted on the major portion of the axial moving block 64. The dove-tail portion 142 is rigidly secured to the major portion of the axial moving block 64 to generally entrap the intermediate gear 136 therein. Accordingly, selective rotation of the adjusting shaft 132 would produce rotation of the intermediate gear 136 as it extends into the groove 140.

The radial moving block 66 includes the dove-tail groove portion 144 of the dove-tail way 130 to receive the dove-tail portion 142 therein to only allow relative radial movement on the axial moving block 64 or 62. The dove-tail groove portion 144 has a centrally disposed rack 146 mounted therein to be in alignment with the groove 140 and in meshed engagement with the intermediate gear 136. Accordingly, the rotation of the adjusting shaft 132 will cause the intermediate gear 136 to act on the rack 146 to move the radial moving block 66 toward or away from the header 10.

Consequently, radial milling is accomplished by the selective use of the adjusting shaft 132 to initially bring the tool 56 to the working surface 12 of the header 10 and then to bring the tool 56 into milling contact with the header 10 until the desired portion of the milling is completed. At that time the adjusting shaft 132 is again used to retract the tool 56 and, after possible circumferential movement CM or axial movement AM, to reposition the tool 56 toward the work area of the header 10 so that it can again be used for controlled radial movement RM to continue the radial milling further into the header 10. If the tool 56 is also being moved in the axial and/or circumferential direction by the selective movement of the axial moving block 64 and/or circumferential moving block 60, the radial adjustment might remain fixed or be repeatedly rotated through a fixed rotational range to effectively produce repeated, circumferentially and/or axially spaced radial milling throughout the arcuate portion 30 of the header 10.

With the preferred circumferential milling machine 40 being configured to allow controlled milling throughout the arcuate portion 30, it is appropriate to see how the machine 40 may best be used with various milling tools 56 to properly prepare the arcuate portion 30 for new welding material and new holes 28 at which new pipes 16 can be installed.

Figure 9:
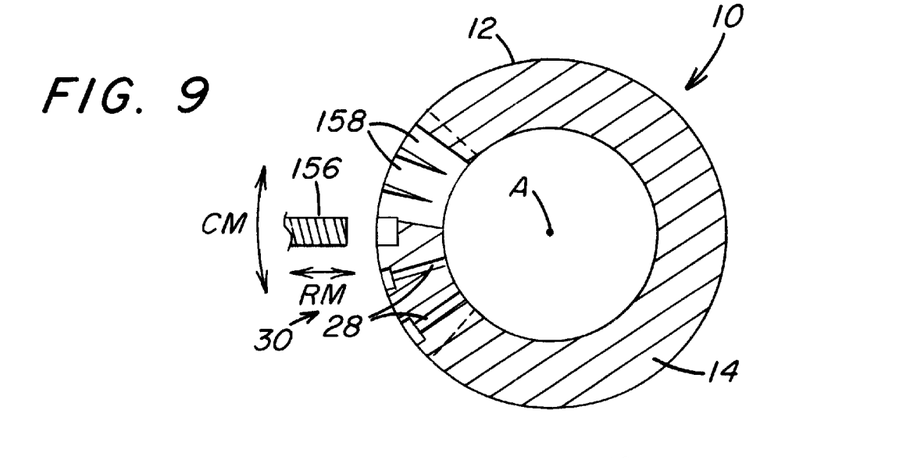
FIG. 9 is the simplified sectional view of the arcuate portion of the cylindrical header like that of FIG. 3 demonstrating a first step of material removal with a hole cutter in the preferred circumferential milling machine.

As seen in FIG. 9, a hole cutter 156 is used to produce a plurality of spaced but possibly intersecting holes 158 throughout the arcuate portion 30. The holes 158 are intended to remove a significant amount of material throughout the portion by first circumferentially and/or axially aligning the hole cutter 156 with a desired location on the surface 12 within the arcuate portion 30 and then radial movement of the hole cutter 156 into and through the wall 14 of the header 10. As each hole 158 is completed, the milling device 54 and the hole cutter 156 thereon are moved circumferentially and/or axially to a different location within the arcuate portion 30 to produce another hole 158.

Figure 10:
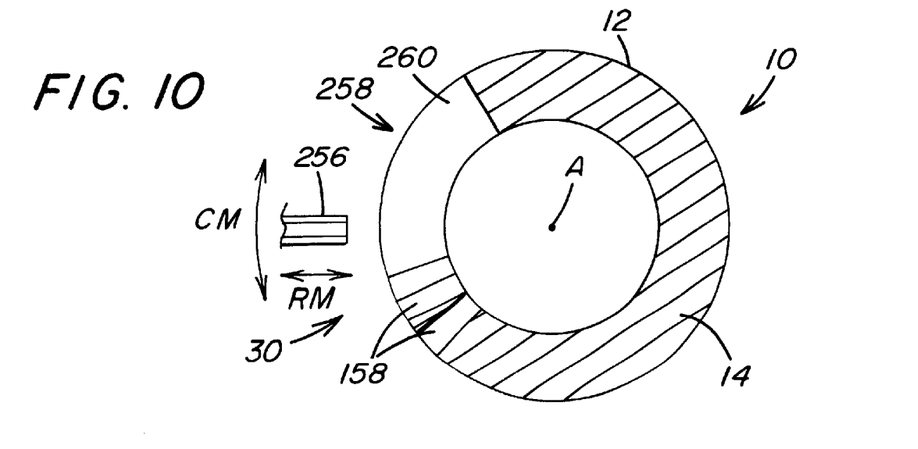
FIG. 10 is a simplified sectional view of the arcuate portion of the cylindrical header of FIG. 9 demonstrating a second step of additional material removal with a side mill cutter in the preferred circumferential milling machine.

As seen in FIG. 10, after a series of partially overlapping or connecting holes 158 have been formed throughout the arcuate portion 30, a side mill cutter 256 is installed on the milling device 54. The side mill cutter is intended to connect all of the holes 158 and remove the remaining material from the arcuate portion 30. For example, the side mill cutter 256 can initially be inserted into one of the holes 158 with the adjusting shaft 132 until the side mill cutter is at least partially inserted into the wall 14. With the radial position fixed, the milling device 54 and the side mill cutter 258 can then be moved circumferentially and/or axially to complete the removal of a fixed thickness of the material from the wall 14 within the arcuate portion 30. After a first thickness is removed, the primary adjustment shaft 122 can again be used to increase the depth of the side mill cutter 256 into one of the holes 158 so that the milling device 54 and the side mill cutter 256 can again be moved circumferentially and axially throughout the arcuate portion 30. This step can be repeated at ever increasing radial depths into the wall 14 until all of the material in the arcuate portion 30 has been removed to provide a uniform width for a circumferential slot 258 formed thereby. The slot 258 would effectively expand all of the holes 28 and holes 158 and all of the material from the weakened areas 20 therebetween. The slot 258 formed in this manner would have all of the side walls 260 thereof which extend generally radially toward the central axis A.

Figure 11:
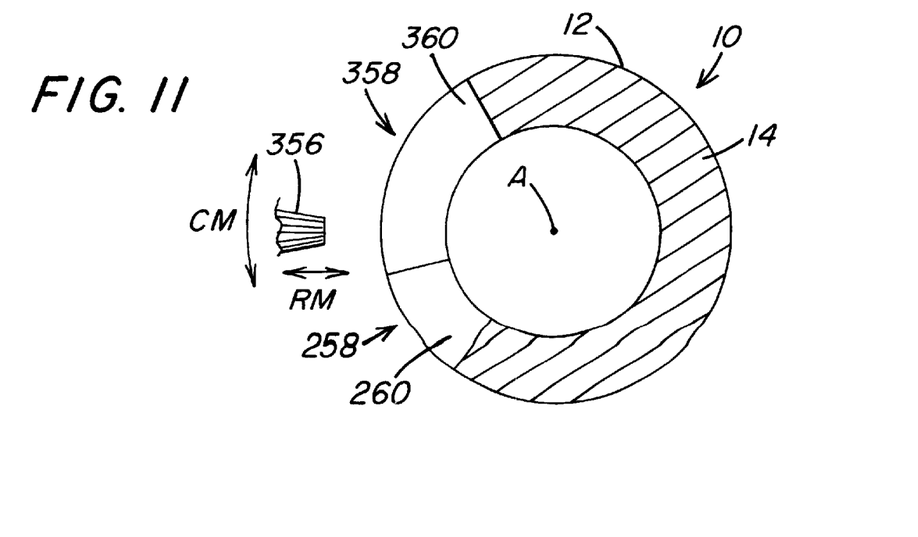
FIG. 11 is a simplified sectional view of the arcuate portion of the cylindrical header of FIGS. 9 and 10 demonstrating a third step of additional material removal with a tapered end mill cutter in the preferred circumferential milling machine.

However, the slot 258 with radially extending side walls 260 is not the form that is preferred for the application of welding material to the header 10 in the arcuate portion 30. Accordingly, a tapered end mill cutter 356 is installed in the milling device 54 to alter the slot 258 and the radial side walls 260 thereof to cause them to be reformed provide a tapered slot 358 with tapered side walls 360 so that the circumferential area of the arcuate portion 30 at the surface 12 of the header 10 is greater than the circumferential area of the arcuate portion 30 near the inside diameter of the header 10. The resulting tapered slot 358 and side walls 360 allow the welding material to be easily built up in layers, one on the other, from the inside portion of the wall 14 to the outer surface 12. The tapered configuration allows better access to the slot 358 and a better surface along the side walls 360 for the application of the welding material to completely and effectively restore the wall 12 in the arcuate portion 30 to a strong, reliable form in which the new holes 28 can be formed and to which the new pipes 16 can be attached.

It will be clear to those skilled in the milling art that the examples of removing material in the arcuate portion 30 shown in FIGS. 9, 10 and 11 might be accomplished by different steps and with different tools 56. However, it should be equally clear that any such effort will be capable of being conveniently and reliably accomplished by the combined use of the movement components of the preferred circumferential milling machine 40.

While the particular means disclosed for the relative mounting of the movement blocks 60, 62, 64 and 66 are preferred, it would also be clear to those skilled in the milling art to provide alternative means that effectively result in the same relationships. Similarly, while the preferred circumferential milling machine 40 includes various effect means for producing and controlling the desired circumferential, axial and radial movement of the present invention, those skill in the art would be capable of utilizing alternative relative motion producing devices which could be alternative employed for the same purposes and to produce the same results. Accordingly, any number of alterations could be made to the preferred embodiment without departing from the scope of the invention as claimed.

What is claimed is:

1. A circumferential milling machine for milling along an arcuate portion of a cylindrical work piece having a cylindrical outer surface and a central axis comprising:

mounting means capable of being mounted on the cylindrical outer surface at the arcuate portion of the cylindrical work piece;

said mounting means including an arcuate supporting element which extends about the cylindrical work piece and has a center which is for being aligned with the central axis;

a circumferential moving block mounted on said arcuate supporting element for circumferential movement along said arcuate supporting element and about said center and the central axis in general alignment with the arcuate portion;

said circumferential moving block capable of being selectively disposed at a plurality of positions along the arcuate portion of the cylindrical outer surface;

said circumferential moving block having a first end and a second end circumferentially displaced from said first end;

a radial moving block capable of being mounted at said first end of said circumferential moving block for radial movement with respect to said circumferential moving block toward and away from the cylindrical outer surface and the central axis of the cylindrical work piece;

a milling device rigidly mounted on said radial moving block and including means for rotating a milling tool installed therein; and said milling tool having an axis of rotation that is generally perpendicular to the cylindrical outer surface and extends through the central axis when said circumferential moving block is disposed at each of said plurality of positions along the arcuate portion of the cylindrical work piece.

2. The circumferential milling machine as set forth in claim 1, wherein said radial moving block is alternatively capable of being mounted at said second end of said circumferential moving block for said radial movement with respect to said circumferential moving block toward and away from the cylindrical outer surface and the central axis of the cylindrical work piece.

3. The circumferential milling machine as set forth in claim 1, further including a first axial moving block which is mounted for relative movement on said first end of said circumferential moving block in an axial direction which is parallel to the central axis when said circumferential moving block is disposed at each of said plurality of positions along the arcuate portion of the cylindrical work piece, wherein said radial moving block is mounted on said first axial moving block for said radial movement with respect to said first axial moving block and said circumferential moving block toward and away from the cylindrical outer surface and the central axis of the cylindrical work piece to cause said axis of rotation to continue to be generally perpendicular to the cylindrical outer surface and to extend through the central axis when said circumferential moving block is disposed at each of said plurality of positions along the arcuate portion of the cylindrical work piece and said axial moving block is selectively positioned along said axial direction relative to said circumferential moving block.

4. The circumferential milling machine as set forth in claim 3, wherein said radial moving block is alternatively capable of being mounted at said second end of said circumferential moving block for said radial movement with respect thereto, further including a second axial moving block which is like said first axial moving block and is mounted for relative movement on said second end of said circumferential moving block in said axial direction when said circumferential moving block is disposed at each of said plurality of positions along the arcuate portion of the cylindrical work piece, and wherein said radial moving block is mounted on said second axial moving block for said radial movement with respect to said second axial moving block and said circumferential moving block toward and away from the cylindrical outer surface and the central axis of the cylindrical work piece in the same manner as when said radial moving block is mounted at said first end of said circumferential moving block.

5. The circumferential milling machine as set forth in claim 4, further including axial adjusting means operably mounted between said circumferential moving block and each of said first and said second axial moving blocks for selectively producing said relative movement of said each of said first and said second axial moving blocks in said axial direction with respect to said circumferential moving block.

6. The circumferential milling machine as set forth in claim 4, further including radial adjusting means operably mounted between each of said first and said second axial moving blocks and said radial moving block mounted thereon for selectively producing said radial movement of said radial moving block with respect to said each of said first and said second axial moving blocks and said circumferential moving block toward and away from the cylindrical outer surface and the central axis of the cylindrical work piece.

7. The circumferential milling machine as set forth in claim 1, wherein said mounting means includes a plurality of radially extending supports each having a first end secured to the cylindrical outer surface and a second end disposed outwardly of the cylindrical outer surface, said radially extending supports are circumferentially displaced along the arcuate portion of the cylindrical work piece, said arcuate supporting element includes a pair of circumferential ways which are axially displaced one from the other at equal distances along the lengths thereof, each of said pair of circumferential ways are respectively mounted by adjustable mounting means at each of said second ends of said plurality of said radially extending supports, and each of said adjustable mounting means are selectively adjusted to cause said center of said arcuate supporting element and each of said circumferential ways thereof to be aligned with the central axis.

8. The circumferential milling machine as set forth in claim 7, wherein said circumferential moving block is mounted between said pair of circumferential ways.

9. The circumferential milling machine as set forth in claim 8, wherein said each of said circumferential ways includes a fixed inner arcuate gear, said circumferential moving block includes a drive shaft which extends in said axial direction and has opposite end gears respectively aligned and engaged with said inner arcuate gears, and said circumferential moving block includes circumferential adjusting means for selective rotation of said drive shaft and said opposite end gears thereof along said fixed inner arcuate gears to produce said circumferential movement of said circumferential moving block along said arcuate supporting element about said center and the central axis of the cylindrical work piece.

10. The circumferential milling machine as set forth in claim 9, wherein said circumferential adjusting means includes an adjusting shaft and attached worm mounted in said circumferential moving block adjacent and perpendicular to said drive shaft, said circumferential adjusting means includes a worm gear rigidly mounted on said drive shaft and in meshing engagement with said worm and said adjusting shaft and attached worm are capable of being selectively rotated for said selective rotation of said drive shaft and said opposite end gears thereof.

11. A circumferential milling machine for milling along an arcuate portion of a cylindrical work piece having a cylindrical outer surface and a central axis comprising:

mounting means capable of being mounted on the cylindrical outer surface at the arcuate portion of the cylindrical work piece;

said mounting means including an arcuate supporting element which extends about the cylindrical work piece and has a center which is for being aligned with the central axis;

said mounting means including a plurality of radially extending supports each having a first end secured to the cylindrical outer surface and a second end disposed outwardly of the cylindrical outer surface;

said radially extending supports being circumferentially displaced along the arcuate portion of the cylindrical work piece;

said arcuate supporting element including a pair of circumferential ways which are axially displaced one from the other at equal distances along the lengths thereof;

each of said pair of circumferential ways being respectively mounted by adjustable mounting means at each of said second ends of said plurality of said radially extending supports;

each of said adjustable mounting means being selectively adjusted to cause said center of said arcuate supporting element and each of said circumferential ways thereof to be aligned with the central axis;

a circumferential moving block mounted on said arcuate supporting element between said pair of circumferential ways for circumferential movement along said arcuate supporting element and about said center and the central axis in general alignment with the arcuate portion;

said circumferential moving block capable of being selectively disposed at a plurality of positions along the arcuate portion of the cylindrical outer surface;

said each of said circumferential ways including a fixed inner arcuate gear;

said circumferential moving block including a drive shaft which extends in said axial direction and has opposite end gears respectively aligned and engaged with said inner arcuate gears;

said circumferential moving block including circumferential adjusting means for selective rotation of said drive shaft and said opposite end gears thereof along said fixed inner arcuate gears to produce said circumferential movement;

said circumferential moving block having a first end and a second end circumferentially displaced from said first end;

first and second axial moving blocks respectively mounted for relative movement on said first end and said second end of said circumferential moving block in an axial direction which is parallel to the central axis when said circumferential moving block is disposed at each of said plurality of positions along the arcuate portion of the cylindrical work piece;

a radial moving block mounted on at least one of said first and said second axial moving blocks for radial movement with respect to said one of said first and said second axial moving blocks and said circumferential moving block toward and away from the cylindrical outer surface and the central axis of the cylindrical work piece;

a milling device rigidly mounted on said radial moving block and including means for rotating a milling tool installed thereon; and said milling tool having an axis of rotation that is generally perpendicular to the cylindrical outer surface and extends through the central axis when said circumferential moving block is disposed at each of said plurality of positions along the arcuate portion of the cylindrical work piece and when said one of said first and said second axial moving blocks is selectively positioned along said axial direction relative to said circumferential moving block.

12. The circumferential milling machine as set forth in claim 11, further including axial adjusting means operably mounted between said circumferential moving block and said one of said first and said second axial moving blocks for selective production of said relative movement of said one of said first and said second axial moving blocks in said axial direction with respect to said circumferential moving block.

13. The circumferential milling machine as set forth in claim 11, further including radial adjusting means operably mounted between said one of said first and said second axial moving blocks and said radial moving block for selective production of said radial movement of said radial moving block with respect to said one of said first and said second axial moving blocks and circumferential moving block toward and away from the cylindrical outer surface and the central axis of the cylindrical work piece.

14. The circumferential milling machine as set forth in claim 11, wherein said circumferential adjusting means includes an adjusting shaft and attached worm mounted in said circumferential moving block adjacent and perpendicular to said drive shaft, said circumferential adjusting means includes a worm gear rigidly mounted on said drive shaft and in meshing engagement with said worm and said adjusting shaft and attached worm are capable of being selectively rotated for said selective rotation of said drive shaft and said opposite end gears thereon.

15. A method of milling of a type which is capable of providing at least one of a plurality of holes and slots along an arcuate portion of a cylindrical work piece having a cylindrical outer surface and a central axis, said method comprising the steps of:

mounting a milling device on the cylindrical work piece with a rotatable milling tool thereof in general alignment toward the arcuate portion and with an axis of rotation thereof that is generally perpendicular to the cylindrical outer surface and extends through the central axis;

selectively radially moving said milling device toward, away from and into the arcuate portion during rotation of said rotatable milling tool to be capable of milling the arcuate portion of the cylindrical work piece; and selectively circumferentially moving said milling device along a circumferential path aligned with the arcuate portion with a center of rotation along said circumferential path being maintained in alignment with the central axis and while maintaining said axis of rotation of said rotatable milling tool generally perpendicular to the cylindrical outer surface and through the central axis; whereby a plurality of holes at circumferentially displaced locations along the arcuate portion are capable of being milled by said selectively circumferentially moving said milling device including said rotatable milling tool which is a hole cutter sequentially to each of said displaced locations and then said selectively axially moving said milling device during said rotation of said hole cutter toward and into said arcuate portion at said each displaced location and whereby at least one slot which extends circumferentially in a arcuate sector of said arcuate portion is capable of being milled by said selectively radially moving said milling device including said rotatable milling tool which is a side mill cutter into at least one location of said arcuate sector and then said selectively circumferentially moving said milling device during said rotation of said side mill cutter as it is advanced throughout said arcuate sector.

16. The method of milling along an arcuate portion of a cylindrical work piece as set forth in claim 15, further including the steps of installing said rotatable milling tool which is a tapered end mill cutter in said milling device and additionally milling by at least one of said selectively radially moving and said selectively circumferentially moving said milling device during rotation of said tapered end mill cutter to produce a tapering of at least a portion of said at least one of said hole and said slot.

17. The method of milling along an arcuate portion of a cylindrical work piece as set forth in claim 15, further including the step of selectively axially moving said milling device at least in an axial direction which is parallel with the central axis while being aligned with the arcuate portion and while maintaining said axis of rotation of said milling tool generally perpendicular to the cylindrical outer surface and through the central axis, whereby at least one of said hole and said slot is capable of being milled by said selectively radially moving said milling device including said side mill cutter into said at least one of said hole and said slot and then said selectively axially moving said milling device during said rotation of said side mill cutter to axially expand said at least one of said hole and said slot in said axial direction.

18. The method of milling along an arcuate portion of a cylindrical work piece as set forth in claim 17, further including the steps of installing said rotatable milling tool which is a tapered end mill cutter in said milling device and additionally milling by at least one of said selectively radially moving, said selectively circumferentially moving, and said selectively axially moving said milling device during rotation of said tapered end mill cutter to produce a tapering of at least a portion of said at least one of said hole and said slot which has been axially expanded.

* * * * *